(12) United States Patent
Bastide et al.

(10) Patent No.: US 9,225,936 B2
(45) Date of Patent: Dec. 29, 2015

(54) AUTOMATED COLLABORATIVE ANNOTATION OF CONVERGED WEB CONFERENCE OBJECTS

(75) Inventors: Paul R. Bastide, Boxford, MA (US); Matthew E. Broomhall, South Burlington, VT (US); Ralph E. LeBlanc, Pepperell, MA (US); Robert E. Loredo, North Miami Beach, FL (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 715 days.

(21) Appl. No.: 13/473,119

(22) Filed: May 16, 2012

(65) Prior Publication Data

US 2013/0311177 A1 Nov. 21, 2013

(51) Int. Cl.
| | | |
|---|---|---|
| *G10L 15/00* | (2013.01) | |
| *G10L 21/00* | (2013.01) | |
| *G10L 25/00* | (2013.01) | |
| *H04N 7/15* | (2006.01) | |
| *H04L 12/18* | (2006.01) | |
| *G10L 15/26* | (2006.01) | |

(52) U.S. Cl.
CPC .............. *H04N 7/15* (2013.01); *H04L 12/1827* (2013.01); *G10L 15/26* (2013.01)

(58) Field of Classification Search
CPC ....... G10L 15/26; G10L 15/22; G10L 15/265; G10L 17/22; G10L 17/00; G10L 21/06; G10L 15/30; G10L 17/005; G10L 2015/223; G10L 15/00; G10L 17/26; G10L 2015/088; G06F 17/21; G06F 3/16; G06F 3/167; B60R 16/0373; G01C 21/3608; H04M 3/5166
USPC ........................ 704/235, 246, 270, 270.1, 275
See application file for complete search history.

(56) References Cited

U.S. PATENT DOCUMENTS

| | | | |
|---|---|---|---|
| 4,339,745 A | 7/1982 | Barber et al. | |
| 6,100,882 A * | 8/2000 | Sharman et al. | ............... 704/235 |
| 6,237,025 B1 * | 5/2001 | Ludwig et al. | ................ 709/204 |
| 6,546,405 B2 | 4/2003 | Gupta et al. | |
| 6,917,965 B2 * | 7/2005 | Gupta et al. | ................... 709/206 |
| 7,028,253 B1 * | 4/2006 | Lieberman et al. | ............ 715/232 |
| 7,269,787 B2 * | 9/2007 | Amitay et al. | ................ 715/230 |
| 7,296,218 B2 | 11/2007 | Dittrich | |
| 7,305,436 B2 * | 12/2007 | Willis | ............................ 709/204 |
| 7,412,383 B1 * | 8/2008 | Alonso et al. | .................. 704/236 |
| 7,562,288 B2 | 7/2009 | Dittrich | |

(Continued)

OTHER PUBLICATIONS

IBM AbilityLab Voice Transcription Manager, http://www-03.ibm.com/able/accessibility_research_projects/vtm.html Date printed: Mar. 2, 2015, pp. 1-3.

(Continued)

*Primary Examiner* — Edgar Guerra-Erazo
(74) *Attorney, Agent, or Firm* — Scully, Scott, Murphy & Presser, P.C.; Dermott Cooke, esq.

(57) ABSTRACT

A methodology may be provided that automatically annotates web conference application sharing (e.g., sharing scenes and/or slides) based on voice and/or web conference data. In one specific example, a methodology may be provided that threads the annotations and assigns authorship to the correct resources.

15 Claims, 4 Drawing Sheets

(56) References Cited

U.S. PATENT DOCUMENTS

| | | | |
|---|---|---|---|
| 7,733,366 | B2 | 6/2010 | Beavers et al. |
| 8,315,430 | B2 | 11/2012 | Kovtun et al. |
| 8,495,496 | B2 | 7/2013 | Bastide et al. |
| 2002/0087595 | A1 | 7/2002 | Friedman et al. |
| 2002/0099552 | A1* | 7/2002 | Rubin et al. ............ 704/270 |
| 2004/0205547 | A1* | 10/2004 | Feldt et al. ............ 715/512 |
| 2006/0031755 | A1* | 2/2006 | Kashi ............ 715/512 |
| 2006/0064342 | A1* | 3/2006 | Frengut et al. ............ 705/10 |
| 2006/0265665 | A1* | 11/2006 | Yoshida ............ 715/781 |
| 2007/0100937 | A1* | 5/2007 | Burtner et al. ............ 709/204 |
| 2008/0008458 | A1 | 1/2008 | Gudipaty et al. |
| 2008/0098295 | A1* | 4/2008 | Nelson et al. ............ 715/233 |
| 2009/0089055 | A1* | 4/2009 | Caspi et al. ............ 704/235 |
| 2009/0210778 | A1* | 8/2009 | Kulas et al. ............ 715/201 |
| 2009/0306981 | A1* | 12/2009 | Cromack et al. ............ 704/235 |
| 2010/0306018 | A1* | 12/2010 | Burtner et al. ............ 705/9 |
| 2011/0307550 | A1 | 12/2011 | Bastide et al. |
| 2011/0307805 | A1 | 12/2011 | Bastide et al. |
| 2011/0313754 | A1 | 12/2011 | Bastide et al. |
| 2012/0005588 | A1 | 1/2012 | Bastide et al. |
| 2012/0005599 | A1 | 1/2012 | Bastide et al. |
| 2012/0039505 | A1 | 2/2012 | Bastide et al. |
| 2012/0260195 | A1* | 10/2012 | Hon et al. ............ 715/753 |
| 2013/0091205 | A1* | 4/2013 | Kotler et al. ............ 709/204 |
| 2013/0091440 | A1* | 4/2013 | Kotler et al. ............ 715/753 |

OTHER PUBLICATIONS

How do I create an attendance report? (8.5), http://www-10.lotus.com/ldd/stwiki.nsf/page.xsp?documentId=2E948AE14BBA661185257A8A006C2BEB&action=openDocument Date printed: Mar. 2, 2015, 1 page.

Mori, S. et al., Optical Character Recognition, John Wiley & Sons, Inc., NY, USA, 1st Edition, (Apr. 1999), http://dl.acm.org/citation.cfm?id=553104, (Abstract only), 1 page.

IBM AbilityLab Voice Transcription Manager, Screen Print-out, https://www.youtube.com/watch?v=NPNgQYyCFKc, Uploaded on Jan. 26, 2011, pp. 1-2.

Sladek, J. et al., Speech-to-text Transcription in Support of Pervasive Computing, Human Systems Integration Group, Date Printed: Mar. 3, 2015, pp. 1-6.

Bergamo, A., et al., Exploiting weakly-labeled Web images to improve object classification: a domain adaptation approach, Conference: Advances in Neural Information Processing Systems 23, (Dec. 2010) pp. 1-9.

Bergamo, A., et al., Exploiting weakly-labeled Web images to improve object classification: a domain adaptation approach, http://vlg.cs.dartmouth.edu/projects/domainadapt/, Date printed: Mar. 2, 2015, pp. 1-4.

Sladek, J. et al., Speech-to-text Transcription in Support of Pervasive Computing, CRPIT '02 Proceedings of the 2002 conference on Pervasive computing, (Month not known, 2002) http://dl.acm.org/citation.cfm?id=1151680, (Abstract only), Date printed: Mar. 3, 2015, pp. 1-2.

\* cited by examiner

AUTOMATED COLLABORATIVE ANNOTATION OF CONVERGED WEB CONFERENCE OBJECTS

BACKGROUND

The present disclosure relates generally to the field of web conferencing.

In various examples, automated collaborative annotation of converged web conference objects may be implemented in the form of systems, methods and/or algorithms.

DESCRIPTION OF RELATED ART

Often when collaborating with others, a web conference is an ideal tool to share a screen and collaboratively edit. The primary presenter must typically coordinate the audio and visual components to effectively collaborate. The audio and visual components are often referred to as converged. With multiple participants, the primary presenter's job is typically unwieldy and requires a high level of coordination.

SUMMARY

In various embodiments, methodologies may be provided that automatically annotate web conference application sharing (e.g., sharing scenes and/or slides) based on voice and/or web conference data.

In one specific example, methodologies may be provided that thread the annotations and assign authorship to the correct resources.

In one embodiment, a method implemented in a computer system for annotating during a web conference, wherein the web conference is carried out via a web conference application in which at least one page of a presentation is shared remotely between at least two people during the web conference is provided, the method comprising: receiving, with the computer system, spoken input from at least one of the two people; transcribing, with the computer system, the received spoken input into transcribed text; analyzing, with the computer system, the page to identify a location of at least one feature of the page; correlating, with the computer system, at least one text element from the transcribed text to the feature of the page; and annotating, with the computer system, the page by displaying in the vicinity of the location of the feature the correlated text element.

In another embodiment, a computer readable storage medium, tangibly embodying a program of instructions executable by the computer for annotating during a web conference, wherein the web conference is carried out via a web conference application in which at least one page of a presentation is shared remotely between at least two people during the web conference is provided, the program of instructions, when executing, performing the following steps: receiving, with the computer, spoken input from at least one of the two people; transcribing, with the computer, the received spoken input into transcribed text; analyzing, with the computer, the page to identify a location of at least one feature of the page; correlating, with the computer, at least one text element from the transcribed text to the feature of the page; and annotating, with the computer, the page by displaying in the vicinity of the location of the feature the correlated text element.

In another embodiment, a computer-implemented web conference system in which at least one page of a presentation is shared remotely between at least two people during a web conference is provided, the system comprising: an input element configured to receive spoken input from at least one of the two people; a transcription element configured to transcribe the spoken input into transcribed text; an analysis element configured to analyze the page to identify a location of at least one feature of the page; a correlation element configured to correlate at least one text element from the transcribed text to the feature of the page; and an annotation element configured to annotate the page by displaying in the vicinity of the location of the feature the correlated text element.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

In one example, one or more systems may provide for automated collaborative annotation of converged web conference objects. In another example, one or more methods may provide for automated collaborative annotation of converged web conference objects. In another example, one or more algorithms may provide for automated collaborative annotation of converged web conference objects.

In one specific example, methodologies may be provided that automatically annotate web conference application sharing (e.g., sharing scenes and/or slides) based on voice and/or web conference data.

In another specific example, methodologies may be provided that thread the annotations and assign authorship to the correct resources.

For the purposes of describing and claiming the present invention the term "web conference" is intended to refer to a remote sharing of information (e.g., audio and video) between two or more people (e.g. via use of web browsers).

For the purposes of describing and claiming the present invention the term "web conference objects" is intended to refer to features having associated annotations positioned on a canvas, screen or page which is presented.

For the purposes of describing and claiming the present invention the term "transcribing spoken input into text" is intended to refer to converting spoken voice into corresponding text.

For the purposes of describing and claiming the present invention the term "text element" is intended to refer to one or more words or word fragments in transcribed text.

For the purposes of describing and claiming the present invention the term "feature" (as used in the context of a feature of a page) is intended to refer to one or more identifiable characteristics (e.g., content, shape, object name and/or object description).

For the purposes of describing and claiming the present invention the term "correlate" (as used in the context of correlating a text element to a feature) is intended to refer to associating a text element to a feature as a result of a match between the text element and the feature. In one example, the match may be a literal exact match. In another example, the match may be based on an idea or a concept.

Figure 1:
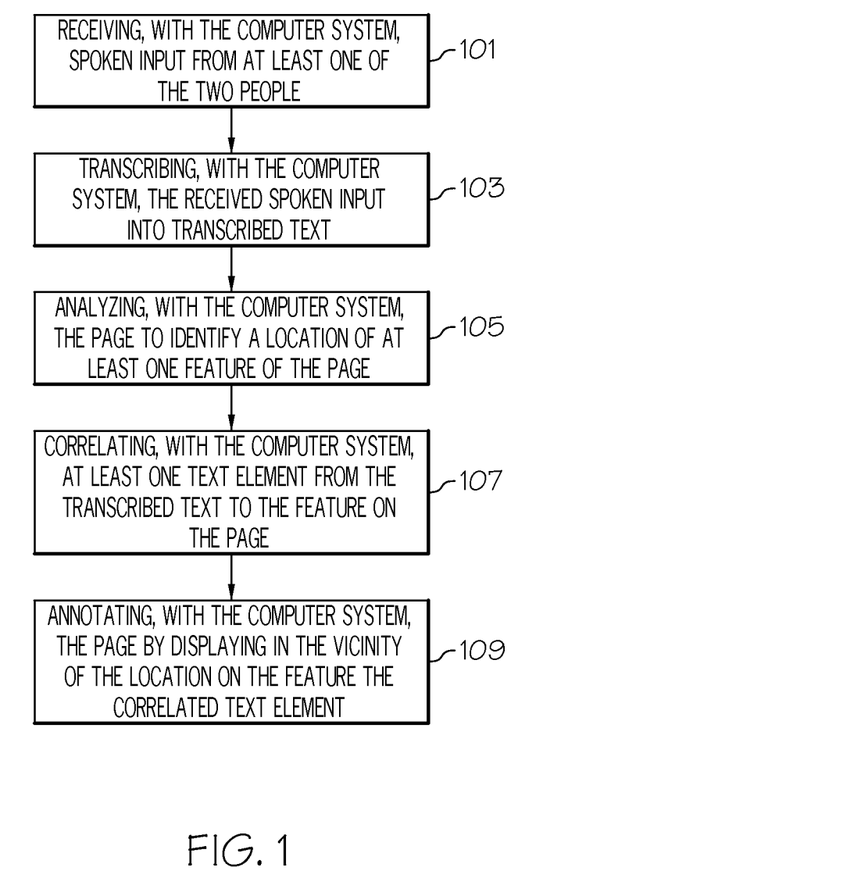
FIG. 1 depicts a flowchart of a method according to an embodiment of the present invention.

Referring now to FIG. 1, a method implemented in a computer system for annotating during a web conference is shown. In this embodiment, the web conference is carried out via a web conference application in which at least one page of a presentation is shared remotely between at least two people during the web conference. As seen in this FIG. 1, the method of this embodiment comprises: Step 101—receiving, with the computer system, spoken input from at least one of the two people; Step 103—transcribing, with the computer system, the received spoken input into transcribed text; Step 105—analyzing, with the computer system, the page to identify a location of at least one feature of the page; Step 107—correlating, with the computer system, at least one text element from the transcribed text to the feature of the page; and Step 109—annotating, with the computer system, the page by displaying in the vicinity of the location of the feature the correlated text element.

In one example, any steps may be carried out in the order recited or the steps may be carried out in another order.

Figure 2:
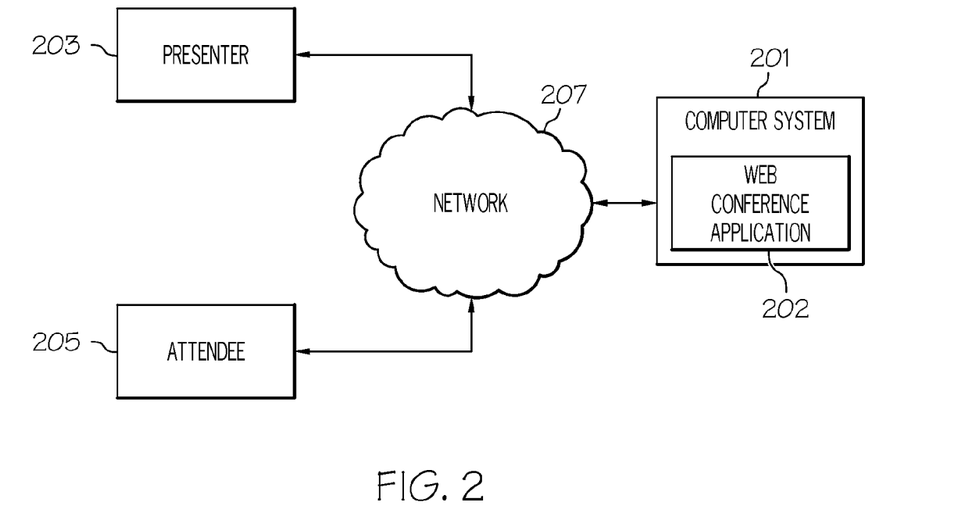
FIG. 2 depicts a block diagram of a system according to an embodiment of the present invention.

Referring now to FIG. 2, a computer-implemented web conference system for annotating during a web conference according to an embodiment of the present invention is shown. In this embodiment, at least one page of a presentation is shared remotely between at least two people during the web conference. As seen in this FIG. 2, computer system 201 (including a web conference application 202) is used to provide a web conference between presenter 203 and attendee 205. In one example, web conference application 202 may comprise software. Of course, while one presenter is shown in this example, any desired number of presenters may be involved. Further, while one attendee is shown in this example, any desired number of attendees may be involved.

Still referring to FIG. 2, the web conference may be carried out via network 207. Of course, network 207 may comprise the Internet, an intranet, a local area network, a wide area network and/or any other desired communication channel(s).

Of note, while FIG. 2 shows the various entities communicating, it is to be understood that this FIG. 2 is actually referring to communication by computer system(s) or the like that are owned, leased, operated, used by, in the possession of, and/or controlled by each of the entities.

In addition, in other examples, various entities (e.g., presenter(s) and/or attendee(s)) may be associated with the same organization or one or more different organizations.

Figure 3:
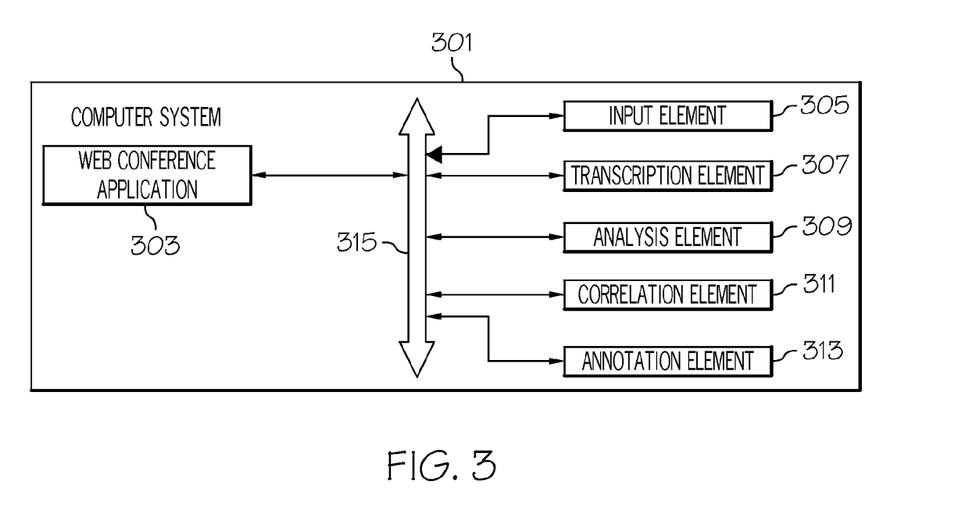
FIG. 3 depicts a block diagram of a system according to an embodiment of the present invention.

Referring now to FIG. 3, a computer system 301 (similar to computer system 201 of FIG. 2) may be provided. As seen in this FIG. 3, computer system 301 may include: (a) web conference application 303; (b) input element 305 (configured to receive spoken input from at least one of two people involved in a web conference); (c) transcription element 307 (configured to transcribe the spoken input into transcribed text); (d) analysis element 309 (configured to analyze the page to identify a location of at least one feature of the page); (e) correlation element 311 (configured to correlate at least one text element from the transcribed text to the feature of the page); and (f) annotation element 313 (configured to annotate the page by displaying in the vicinity of the location of the feature the correlated text element). Further, as seen, each of the components may be operatively connected via communication channel 315. Further still, in one example, one or more of the components may comprise software.

Figure 4:
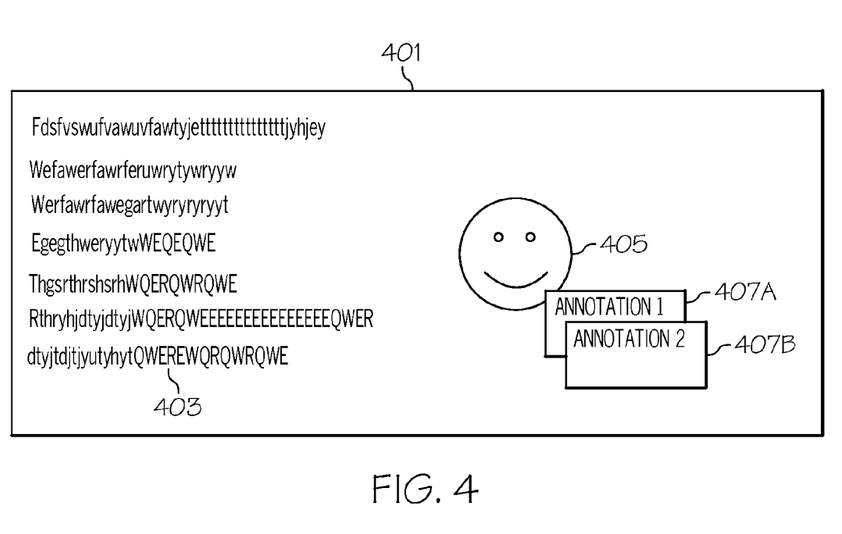
FIG. 4 depicts an example web conference screen according to an embodiment of the present invention.

Referring now to FIG. 4, an example web conference screen according to an embodiment of the present invention is shown. As seen in this example, the web conference screen 401 may include thereon text 403 and a logo 405. Overlaid in the vicinity of the logo 405 are two annotations (Annotation 1—identified as callout number 407A and Annotation 2—identified as callout number 407B). In this example, the annotations are in the vicinity of the logo 405 by being partially overlaid on top of the logo 405. In other examples, the annotation(s) may be in the vicinity of the corresponding feature by entirely overlaying the corresponding feature or may not overlay the corresponding feature at all (e.g., be adjacent to the corresponding feature). Of note, the annotation(s) may be from the same person or from different people.

Figure 5:
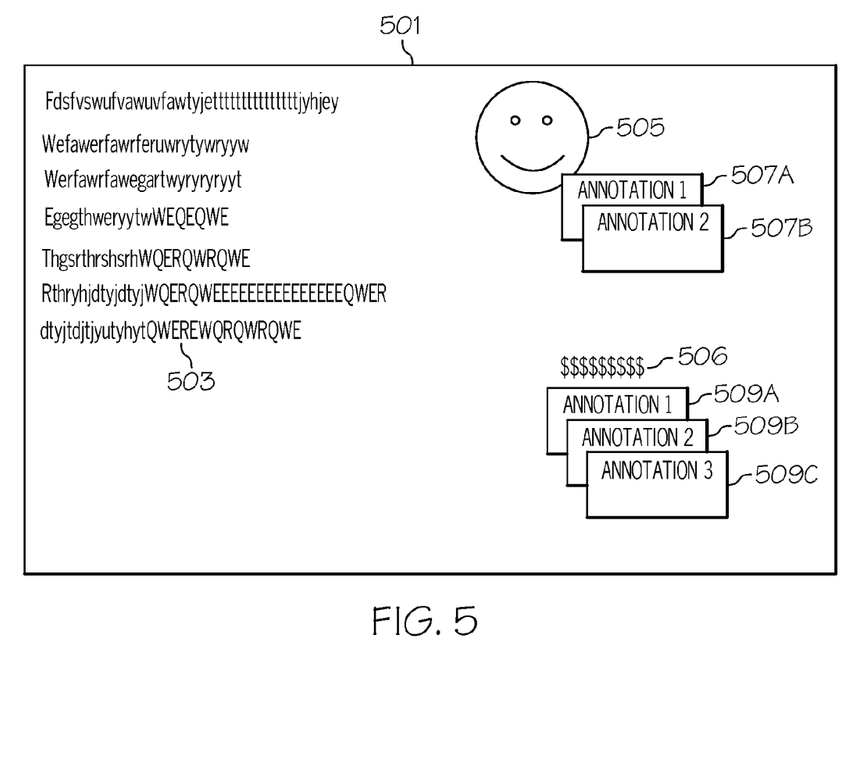
FIG. 5 depicts an example web conference screen according to an embodiment of the present invention.

Referring now to FIG. 5, another example web conference screen according to an embodiment of the present invention is shown. As seen in this example, the web conference screen 501 may include thereon text 503, a logo 505 and pricing information 506. Overlaid in the vicinity of the logo 505 are two annotations (Annotation 1—identified as callout number 507A and Annotation 2—identified as callout number 507B). Further, overlaid in the vicinity of the pricing information 506 are three annotations (Annotation 1—identified as callout number 509A, Annotation 2—identified as callout number 509B and Annotation 3—identified as callout number 509C). In this example, the annotations 507A and 507B are partially overlaid on top of the logo 505. Further, in this example, the annotations 509A, 509B and 509C are next to pricing information 506. In other examples, the annotation(s) may entirely overlay the corresponding feature, may partially overlay the corresponding feature or may not overlay the corresponding feature at all. Of note, the annotation(s) may be from the same person or from different people.

Still referring to FIG. 5, it is seen that an example of "threading" according to an embodiment is shown. More particularly, it is seen that the annotations 507A and 507B associated with the logo 505 form a first "thread" and that the annotations 509A, 509B and 509C associated with the pricing information 506 form a second "thread". While the annotations of each "thread" are shown in this FIG. 5 in a manner similar to index cards laid on top of each other, any other desired graphical and/or text form(s) may be used (e.g., a 1.0, 1.1, 1.2, 1.3 . . . outline format and/or any other format showing a relationship (e.g., a text relationship)).

In another example, the speaker associated with each annotation may be identified (e.g., indicating the speaker's name along with each annotation).

In another example, a plurality of pages of a presentation may be shared remotely between at least two people during a web conference. In this case, the following may be provided: (a) analyzing (e.g., with a computer system), a first one of the plurality of pages to identify a location of at least one feature of the first one of the plurality of pages; (b) correlating (e.g., with a computer system), at least a first text element (e.g., associated with transcribed text) to the feature of the first one of the plurality of pages; (c) annotating (e.g., with a computer system), the first one of the plurality of pages by displaying in the vicinity of the location of the first feature the first correlated text element; (d) analyzing (e.g., with a computer system), a second one of the plurality of pages to identify a location of at least one feature of the second one of the plurality of pages; (e) correlating (e.g., with a computer system), at least a second text element (e.g., associated with transcribed text) to the feature of the second one of the plurality of pages; and (f) annotating (e.g., with a computer system), the second one of the plurality of pages by displaying in the vicinity of the location of the feature the second correlated text element.

In another example, a page of a presentation may be shared remotely between a presenter and a plurality of attendees during a web conference. In this case, the following may be provided: (a) receiving (e.g., with a computer system) spoken input from each of the plurality of attendees and transcribing the spoken input from each of the plurality of attendees into respective transcribed text; (b) correlating (e.g., with a computer system), at least one text element from the transcribed text to the feature of the page; and (c) annotating (e.g., with a computer system), the page by displaying in the vicinity of the location of the feature the correlated text element.

Figure 6:
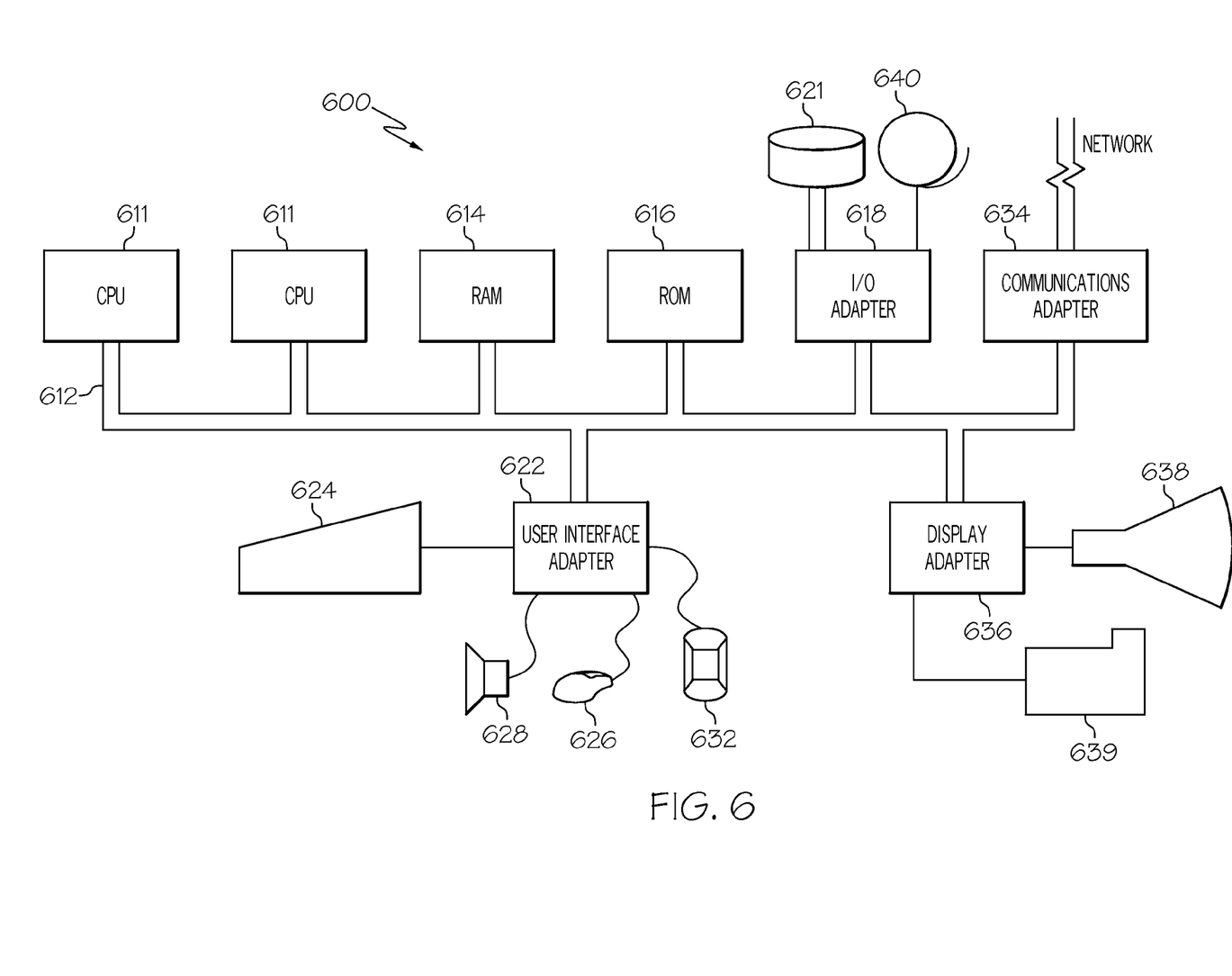
FIG. 6 depicts a block diagram of a system according to one embodiment of the present invention.

Referring now to FIG. 6, this figure shows a hardware configuration of computing system 600 according to an embodiment of the present invention. As seen, this hardware configuration has at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communications adapter 634 for connecting the system 600 to a data processing network, the Internet, an Intranet, a local area network (LAN), etc., and a display adapter 636 for connecting the bus 612 to a display device 638 and/or printer 639 (e.g., a digital printer or the like).

Reference will now be made to operation according to one embodiment. In this example, operation may proceed as follows: (a) a Presenter begins a web conference; (b) a User1 and a User2 join the web conference; (c) the Presenter, User1 and User2 join an audio discussion; (d) the Presenter displays Slide1 in the web conference; (e) the User1 starts a discussion, for example, by commenting verbally to the effect that "The logo is not correct"; (f) the User2 adds a comment (e.g., by verbally agreeing or verbally disagreeing with User1); and (g) the Presenter sees an overlay of a threaded annotation (e.g., containing the text of User1 and User2 verbal comments) over the logo on the Slide1.

In one example, the embodiment described above may be implemented as follows: (a) a Presenter starts a web conference using, e.g., IBM SmartCloud Meeting or any other appropriate mechanism; (b) the Presenter shares a screen or slide; (c) the Presenter joins an audio conference bridge; (d) the Presenter links the audio conference to the web conference; (e) an Attendee (e.g., User1, User2) navigates to the web conference page; (f) each Attendee enters profile information (e.g., name, phone, email); (g) each Attendee joins the conference (audio and web). In one specific example, a system such as Premiere Conference may be used (whereby an audio conference system can be managed via a web interface and whereby a user is enabled to be able to tell who is speaking).

In one example, the embodiment described above may be implemented by utilizing one of more of the following: (a) an Annotation Service (e.g., a computer implemented software service); (b) a Scene Analysis Service (e.g., a computer implemented software service); and/or (c) a Slide Analysis Service (e.g., a computer implemented software service).

In one specific example, an Annotation Service may operate as follows: (a) a Presenter activates the Annotation Service; (b) the Presenter changes a scene/slide; (c) the system detects the scene/slide change—if a slide, the system submits the slide to a slide analysis service (discussed in more detail below); if a scene, the system captures the image, and submits the captured image to a scene analysis service (discussed in more detail below); (d) the system returns one or more annotation markers (e.g., X-Y coordinates of one or more web conference objects and related reference data, such as the topic of each web conference object); (e) the Attendee(s) and Presenter(s) speak; (f) the system transcribes the voices to text; (g) the system analyzes the text of the voices and detects one or more coincidences of reference data and text; (h) the system marks the appropriate X-Y coordinate(s); (i) the system puts text into the appropriate annotation marker; (j) the system continues to thread Attendee/Presenter speech-to-text. In one example, while there is no new coincidence of reference data and speech-to-text, the system may continue to thread. In another example, if there is a scene change or slide change, the system begins a new analysis. In yet another example, the system may asynchronously load the annotations as the analysis completes.

In another specific example, a Scene Analysis Service may operate as follows: (a) the system analyzes an image for one or more recognized objects; (b) the system determines where the object(s) are on the page, the system also determines the name of the object(s); (c) the system returns one or more annotation markers (e.g., X-Y coordinates of one or more web conference objects and related reference data, such as the name of each web conference object); (d) the system returns to the annotation service.

In another specific example, a Slide Analysis Service may operate as follows: (a) the system analyzes the markup of the slide (e.g., ODF, HTML, PDF); (b) the system checks the shapes on the slide; (c) the system determines the X-Y Coordinates of each shape and text of each shape; (d) the system returns to the annotation service.

In another example, a system (or corresponding method or algorithm) may provide for presenter/attendee coordination of actions.

In another example, a system (or corresponding method or algorithm) may provide for effective collaboration between/among a plurality of generated annotations.

In another example, a system (or corresponding method or algorithm) may provide for annotations related to words, shapes and/or actions.

In another example, a system (or corresponding method or algorithm) may provide for real time annotations.

In another example, a system (or corresponding method or algorithm) may provide for relevant context in a live threading environment.

In another example, a system (or corresponding method or algorithm) may provide for threading and placement of annotated threads for a group of people participating in a presentation or discussion associated with the presentation.

In another example, a system (or corresponding method or algorithm) may be provided for aiding collaborative screen sharing, comprising: a web conference application available to multiple participants sharing a common collaborative screen; one or more slides and/or screens having voice and/or web data associated therewith and comprising the web conference application; at least a portion of a respective one or more of the slides/screens trackable for discussion thread(s) associated therewith; and annotations comprised of the associated discussion thread(s) provided to the participants in the shared collaborative screen.

In another example, a system (or corresponding method or algorithm) may provide for automatically annotating a multimedia presentation based on comment(s) by user(s).

In another example, a system (or corresponding method or algorithm) may provide for automatically identifying and annotating content in a multimedia presentation, based on user comments converted from voice to text.

In another example, a system (or corresponding method or algorithm) may store annotated updates for replay, or further review.

In another example, the user may have the option to make changes to the presentation material based on the annotation in real time, or make changes later during playback.

In another example, a system (or corresponding method or algorithm) may scope annotations to subconferences or groups of users. In one specific example, scopes may be used to hide annotations from others. In another specific example, scopes may be used to automatically limit annotations. In another specific example, scopes may be automatically expanded or limited to a dynamic set of users.

In another example, a system (or corresponding method or algorithm) may enable drag-and-drop for generated annotations.

In another example, a system (or corresponding method or algorithm) may enable modifications of generated annotations.

In another example, a system (or corresponding method or algorithm) may use modifications to further enhance the system (or corresponding method or algorithm).

In another example, a system (or corresponding method or algorithm) may scope enhancements to users.

In another example, a system (or corresponding method or algorithm) may enable type-ahead (e.g., for frequent authors of an annotation).

In another example, a system (or corresponding method or algorithm) may further define keywords per slide or scene or overlay at the change of scene or slide.

In another example, a system (or corresponding method or algorithm) may prompt a user to redact annotations.

In another example, a system (or corresponding method or algorithm) may define a charge back model for the annotation feature.

In another example, a system (or corresponding method or algorithm) may define a policy to enable the annotation feature for a select set of users.

In another example, a system (or corresponding method or algorithm) may display annotations beyond the time of scene or slide change in order for users to appropriately respond to an annotation in text or verbal form.

In another example, a system (or corresponding method or algorithm) may generate a graphical report which summarizes the action items generated through the annotations at the end of the meeting and send it to all the meeting attendee(s) and/or presenter(s). In one specific example, the report can contain information such as: User 1 and User 2 will meet regarding subject A; User 3 needs to follow up with User 4 via email regarding subject A(1).

In another example, a system (or corresponding method or algorithm) may further be used to generate enhanced reporting, thereby providing a speaker/presenter/company information on the items which are of the most importance regarding discussion/annotations. Reports may be given for individual objects and shapes based on the location of the annotations.

In another example, a system (or corresponding method or algorithm) may enable selective enablement of the web conference annotation.

In another example, a system (or corresponding method or algorithm) may autogenerate tags, whereby the system (or corresponding method or algorithm) or users may correlate annotations across slides and scenes.

In another example, once a system (or corresponding method or algorithm) analyzes the annotation and associates it with the object on the screen, the system (or corresponding method or algorithm) may display the object to be edited in a lightbox so the user(s) can focus on editing that object directly.

In another example, a system (or corresponding method or algorithm) is not limited to displaying the annotations a particular way. The system (or corresponding method or algorithm) may display these annotations as cards, which can popup and be iterated through.

In another example, a system (or corresponding method or algorithm) may generate threads with topics, in/not in synchronous order.

In another example, a system (or corresponding method or algorithm) may add recommendation and/or voting to the generated topics, objects and/or threads.

As described herein, various embodiments may provide one or more of the following advantages: (a) improved user experience; (b) reduced coordination of user data and voice input; and/or (c) automated threading of discussions.

In other embodiments one or more of the following may be used to implement various aspects: (a) the IBM AbilityLab Voice Transcription Manager Research Project (http://www-03.ibm.com/able/accessibility_research_projects/vtm.html); (b) IBM SmartCloud Meeting/Web Dialogs/Cisco WebEx/Citrix Meetings; (c) Optical Character Recognition (OCR); (d) Image/Object Recognition (e.g., http://bing.com); and/or Dragon Naturally Speaking.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method implemented in a computer system for annotating during a web conference, wherein the web conference is carried out via a web conference application in which at least one page of a presentation is shared remotely between at least a first user and a second user during the web conference, the method comprising the steps of:
    receiving, with the computer system, spoken input from at least the first and second users;
    transcribing, with the computer system, the received spoken input from the first user into first user transcribed text;
    transcribing, with the computer system, the received spoken input from the second user into second user transcribed text;
    analyzing, with the computer system, the page to identify a location of at least one feature of the page;
    correlating, with the computer system, a plurality of first user text elements from the first user transcribed text to the feature of the page;
    correlating, with the computer system, a plurality of second user text elements from the second user transcribed text to the feature of the page;
    annotating, with the computer system, the page by displaying in the vicinity of the location of the feature the correlated first user text elements; and
    annotating, with the computer system, the page by displaying in the vicinity of the location of the feature the correlated second user text elements;
    wherein the location is an X-Y coordinate location;
    wherein the annotating associated with the first user text elements displays a plurality of annotations;
    wherein the annotating associated with the second user text elements displays a plurality of annotations; and
    wherein the annotations are displayed in a threaded manner for each of the first user and the second user in a synchronous order and such that each subsequent annotation is displayed at least partially overlapping a previous annotation.

2. The method of claim 1, wherein the first user is a presenter and the second user is an attendee.

3. The method of claim 1, wherein:
the analyzing, with the computer system, the page to identify the location of at least one feature of the page comprises: (a) analyzing, with the computer system, the page to identify a first location of a first feature of the page; and (b) analyzing, with the computer system, the page to identify a second location of a second feature of the page;
the correlating, with the computer system, the plurality of first user text elements comprises correlating each of the plurality of first user text elements to one of the first and second features of the page;
the correlating, with the computer system, the plurality of second user text elements comprises correlating each of the plurality of second user text elements to one of the first and second features of the page;
the annotating, with the computer system, the page by displaying the correlated first user text elements comprises displaying in the vicinity of each location of each of the first and second features one of the correlated first user text elements; and
the annotating, with the computer system, the page by displaying the correlated second user text elements comprises displaying in the vicinity of each location of each of the first and second features one of the correlated second user text elements.

4. The method of claim 1, wherein the page comprises one of a slide and a scene.

5. The method of claim 1, wherein the vicinity of the location of the feature is overlaid on top of the feature.

6. The method of claim 1, wherein the correlation between each text element to the feature of the page is an exact correlation.

7. The method of claim 1, wherein the feature is selected from the group including: (a) a name; (b) a shape; and (c) a content.

8. The method of claim 1, wherein the steps are carried out in an order as recited.

9. A non-transitory computer readable storage medium, tangibly embodying a program of instructions executable by the computer for annotating during a web conference, wherein the web conference is carried out via a web conference application in which at least one page of a presentation is shared remotely between at least a first user and a second user during the web conference, the program of instructions, when executing, performing the following steps:
receiving, with the computer, spoken input from at least the first and second users;
transcribing, with the computer, the received spoken input from the first user into first user transcribed text;
transcribing, with the computer, the received spoken input from the second user into second user transcribed text;
analyzing, with the computer, the page to identify a location of at least one feature of the page;
correlating, with the computer, a plurality of first user text elements from the first user transcribed text to the feature of the page;
correlating, with the computer, a plurality of second user text elements from the second user transcribed text to the feature of the page;
annotating, with the computer, the page by displaying in the vicinity of the location of the feature the correlated first user text elements; and
annotating, with the computer, the page by displaying in the vicinity of the location of the feature the correlated second user text elements;
wherein the location is an X-Y coordinate location;
wherein the annotating associated with the first user text elements displays a plurality of annotations;
wherein the annotating associated with the second user text elements displays a plurality of annotations; and
wherein the annotations are displayed in a threaded manner for each of the first user and the second user in a synchronous order and such that each subsequent annotation is displayed at least partially overlapping a previous annotation.

10. The computer readable storage medium of claim 9, wherein the first user is a presenter and the second user is an attendee.

11. The computer readable storage medium of claim 9, wherein:
the analyzing, with the computer, the page to identify the location of at least one feature of the page comprises: (a) analyzing, with the computer, the page to identify a first location of a first feature of the page; and (b) analyzing, with the computer, the page to identify a second location of a second feature of the page;
the correlating, with the computer, the plurality of first user text elements comprises correlating each of the plurality of first user text elements to one of the first and second features of the page;
the correlating, with the computer, the plurality of second user text elements comprises correlating each of the plurality of second user text elements to one of the first and second features of the page;
the annotating, with the computer, the page by displaying the correlated first user text elements comprises displaying in the vicinity of each location of each of the first and second features one of the correlated first user text elements; and
the annotating, with the computer, the page by displaying the correlated second user text elements comprises displaying in the vicinity of each location of each of the first and second features one of the correlated second user text elements.

12. The computer readable storage medium of claim 9, wherein the steps are carried out in an order as recited.

13. A computer-implemented web conference system in which at least one page of a presentation is shared remotely between at least a first user and a second user during a web conference, the system comprising:
a processor; and
a memory storing computer readable instructions that, when executed by the processor, implement:
an input element configured to receive spoken input from at least the first and second users;
a transcription element configured to: (a) transcribe the received spoken input from the first user into first user transcribed text; and (b) transcribe the received spoken input from the second user into second user transcribed text;
an analysis element configured to analyze the page to identify a location of at least one feature of the page;
a correlation element configured to: (a) correlate a plurality of first user text elements from the first user transcribed text to the feature of the page; and (b) correlate a plurality of second user text elements from the second user transcribed text to the feature of the page; and an annotation element configured to: (a) annotate the page by displaying in the vicinity of each location of the feature the correlated first user text elements; and (b) annotate the page by displaying in the vicinity of each location of the feature the correlated second user text elements;

wherein the location is an X-Y coordinate location;

wherein the annotating associated with the first user text elements displays a plurality of annotations;

wherein the annotating associated with the second user text elements displays a plurality of annotations; and wherein the annotations are displayed in a threaded manner for each of the first user and the second user in a synchronous order and such that each subsequent annotation is displayed at least partially overlapping a previous annotation.

14. The system of claim 13, wherein the first user is a presenter and the second user is an attendee.

15. The system of claim 13, wherein:

the analysis element is configured to: (a) analyze the page to identify a first location of a first feature of the page; and (b) analyze the page to identify a second location of a second feature of the page;

the correlation element is configured to: (a) correlate each of the plurality of first user text elements to one of the first and second features of the page; and (b) correlate each of the plurality of second user text elements to one of the first and second features of the page; and the annotation element is configured to: (a) annotate the page by displaying in the vicinity of each location of each of the first and second features one of the correlated first user text elements; and (b) annotate the page by displaying in the vicinity of each location of each of the first and second features one of the correlated second user text elements.

* * * * *